April 18, 1939. H. GOEDDERTZ 2,154,810
TRAILER
Filed March 29, 1937 3 Sheets-Sheet 1
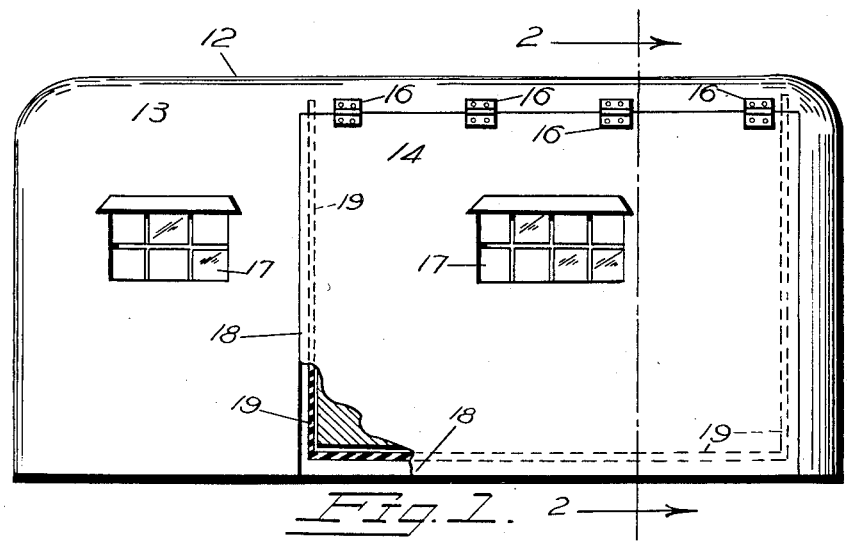
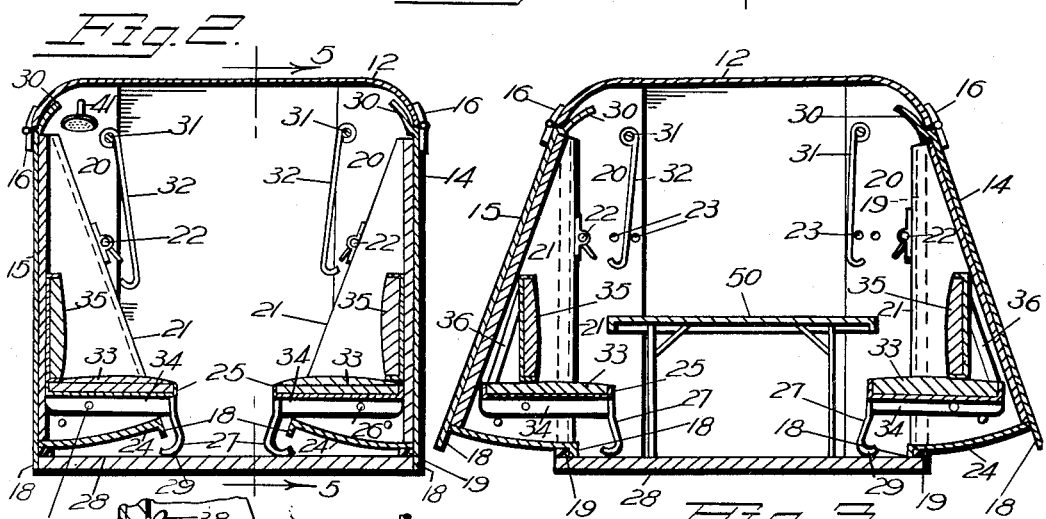
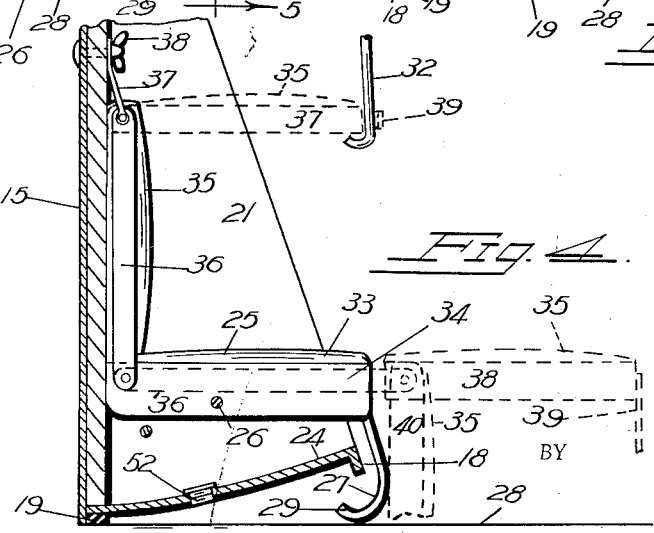
INVENTOR.
HENRY GOEDDERTZ
BY
ATTORNEY.

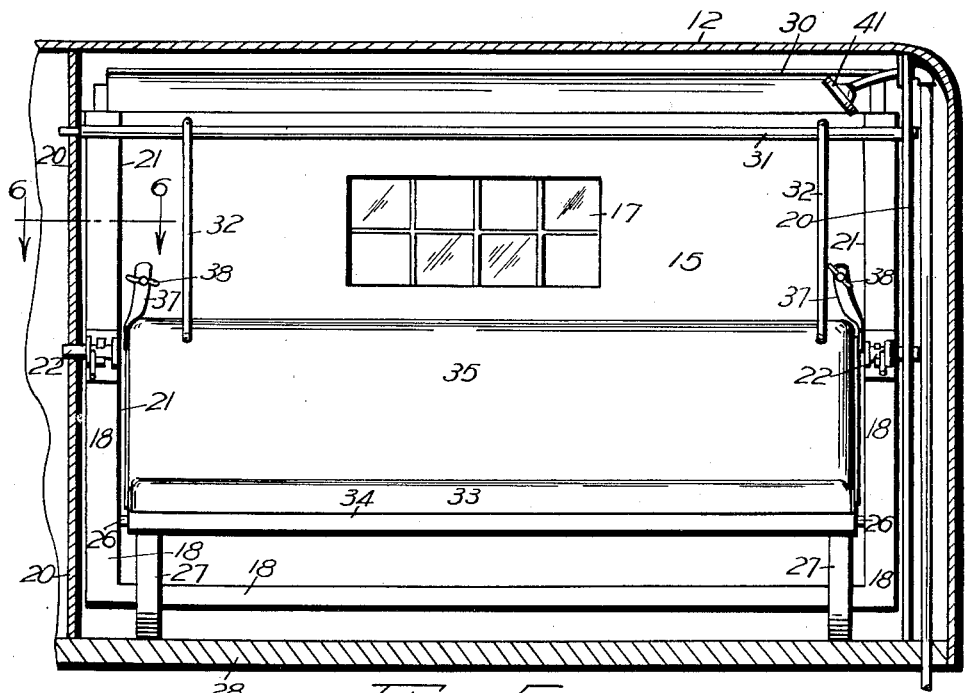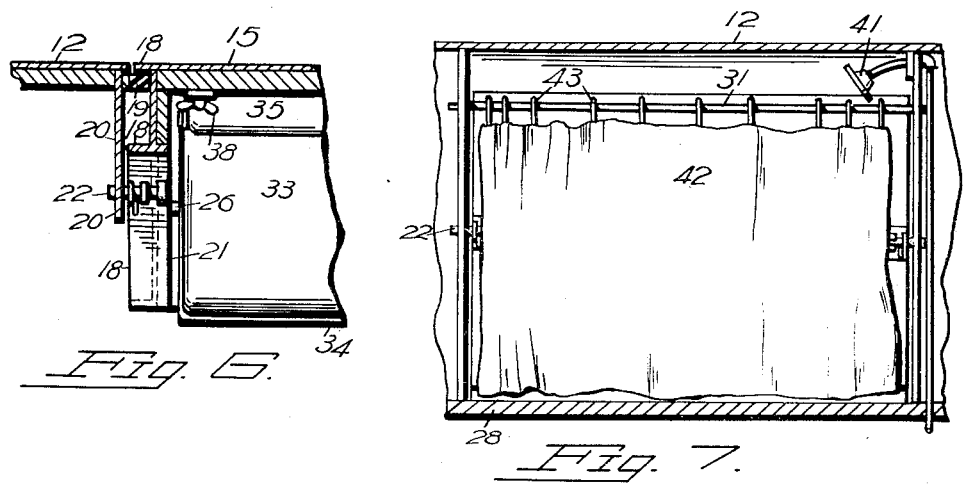

April 18, 1939.  H. GOEDDERTZ  2,154,810
TRAILER
Filed March 29, 1937  3 Sheets-Sheet 3

INVENTOR.
HENRY GOEDDERTZ
BY H. A. McGrew
ATTORNEY.

Patented Apr. 18, 1939

2,154,810

UNITED STATES PATENT OFFICE 2,154,810

TRAILER

Henry Goeddertz, Denver, Colo.

Application March 29, 1937, Serial No. 133,586

2 Claims. (Cl. 296—23)

This invention relates to improvements in bodies for automobile house trailers and the like.

Objects

An object of the invention is the provision of a trailer body of light weight that may be expanded to increase its volume.

Another object of the invention is to provide a house trailer having a normal width no greater than the average automobile but which can be widened to increase its capacity when not on a highway.

Another object is the provision of a trailer of this type that has seats which may be converted into sleeping berths or beds.

A further object is to provide a house trailer that has expansible walls maintained in sealed relation to the body in all positions to prevent passage of sound, dust, moisture and the like to the trailer interior.

A still further object is the provision of a trailer having shower bath facilities incorporated in space normally used for seating or sleeping.

Still another object is to provide a house trailer having pivotally expansible sections carrying seats that retain a normal level in all positions of the pivotal movement.

Other objects and advantages reside in details of construction and design which will be more fully disclosed in the following description and in the drawings wherein like parts have been similarly designated and in which;

Figure 1 is a side elevation, partly in section, of a trailer body built according to the present invention;

Figure 2 is a transverse section taken on line 2—2 of Figure 1;

Figure 3 is a transverse section along the line 2—2 of Figure 1 but showing the expansible side sections in their expanded position;

Figure 4 is a fragmentary sectional view showing certain details of construction of the convertible seats;

Figure 8:
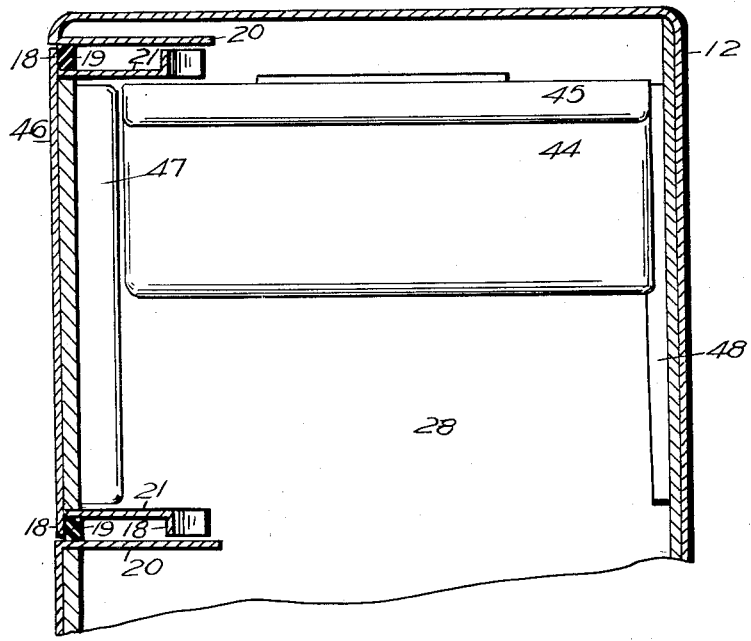
Figure 9:
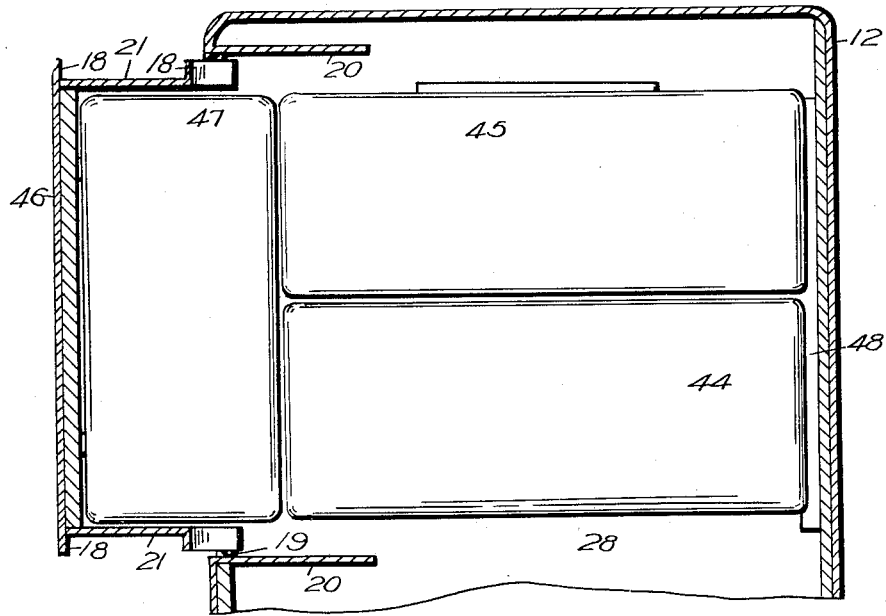

Figure 4—A is a fragmentary view showing certain details of the seat construction;

Figure 5 is a fragmentary longitudinal section approximately along the line 5—5 of Figure 2;

Figure 6 is a fragmentary view in section on line 6—6 of Figure 5;

Figure 7 is a central longitudinal fragmentary view showing the shower bath facilities in operative position;

Figure 8 illustrates sectionally, a portion of a trailer body built according to a modified form of the invention; and Figure 9 is a sectional view of a portion of a trailer body similar to that shown in Figure 8 but with the parts shown in their expanded position.

Construction

In the drawings, numeral 12 denotes a trailer body suitable for mounting on any type running gear or on an automobile or truck chassis, numeral 13 designates a non-expansible portion usually used as a kitchen, while outwardly movable wall sections in the remaining portion of the body are shown at 14 and 15 each pivoted or hinged as indicated by 16. A plurality of windows 17 may be provided as wanted.

The vertical edges and lower edge of each movable wall section are double flanged as shown by reference character 18, and a sealing medium, such as a sponge rubber strip 19, borders the sides and the bottom of the opening in the body so that the flanges 18 will engage the seal in either the open or closed position of the sections to exclude dirt and deaden noise.

Within the trailer body are narrow stationary partitions 20 located at either side of the movable sections. Adjacent these partitions and attached to the movable sections are angle plates or sectors 21, each of which is provided with a sliding bolt 22, which is adapted to engage one of a plurality of holes 23 in the partitions 20, for the purpose of securely locking the movable wall sections in selected positions as clearly shown in Figures 2 and 3.

A curved or arcuate bottom 24 is attached to each movable section and subtends the angle formed between the wall section and the sector plates 21. The bottom 24 and sectors 21 maintain the closure of the body in all positions of the movable sections, and it will be noted that the bottom presses against the seal 19 at all points in its pivotal movement to complete the sealing effect thereof.

Longitudinal seats 25 are partially supported by angle plates 21, by means of pivots 26 at each end. The front edges of the respective seats are provided with suitable legs 27 that bear on the body floor 28 and preferably terminate in rounded lower ends 29. The upper horizontal edge of each movable wall section is inwardly offset to lap the stationary adjacent structure of the body as shown at 30.

A horizontal rod 31 extends between each pair of partitions 20 at a point adjacent the top of the body. Each rod 31 is provided with a plurality of straps or hooked members 32, which are slidably and rotatably mounted thereon.

Referring to Figures 4 and 4—A, the details of the seat construction are clearly illustrated. The horizontal portion of each seat is composed of a removable cushion member 33 supported by a frame 34, which is pivoted at 26. A separate back member 35 is carried on pivotal links 36, which may be held in the upright position illustrated in Figure 4, by means of flexible attachment members 37 that are releasably held by wing nuts 38 to the movable wall section.

The component parts of the seat assembly are capable of various relative arrangements, as illustrated in Figure 4. The back portion 35 may be pivoted to an upper horizontal position, as shown in broken lines at 37, in which position it is partially supported by the hooked members 32. The link members 36 may be rotated forwardly to place the back member 35 in a horizontal position at substantially the same level as the seat 33, as shown in broken lines at 38. In this position the back member 35 is partially supported by a pair of pivoted legs 39, which may be rotated to a vertical position for the purpose, so that they bear on the floor 28. A third position of the back member 35 is illustrated in broken lines at 40, this position being for a purpose that will be hereinafter explained.

A shower fixture 41 may be mounted inwardly on one of the stationary partitions 20 and be connected with any convenient source of water under pressure, such as a water tank carried by the trailer and being provided with a pneumatic pressure cushion as is well-known in the art. Since the details of the water supply are not a part of this invention, they are not illustrated.

In Figure 7 is illustrated a shower curtain 42 which may be hung on the rod 31, by means of a plurality of hooks 43 when desired.

Figures 8 and 9 illustrate a trailer body built according to a modified form of the invention wherein a cushion member 44 forms a seat adjacent an end of the trailer body and cushion 45 serves as a back. An expansible wall section 46 that is similar in construction to the ones hereinabove described, carries another cushion member 47, which serves, in the position illustrated in Figure 8, as an additional back rest. The section 46 may be moved outwardly, as shown in Figure 9, and the cushion 47 carried thereby may be then lowered to a horizontal position. The cushions 44 and 45 may be then arranged in parallel relation, the right ends thereof being supported by rail 48, and the other ends supported by any convenient well-known means, such as folding legs as hereinabove described. The cushion 47, when in its horizontal position, may likewise be supported by folding legs similar to 39.

*Operation*

In use, the movable wall sections are normally locked in their innermost positions, as shown in Figures 2 and 8, so that the trailer, when on a highway, will occupy a minimum space. Trailers having no greater width than the automobile by which they are drawn, are more easily towed, with less danger of accident than are trailers which extend laterally beyond the width of the towing car.

When a camping destination has been reached, either or all of the expansible wall sections may be moved outwardly as illustrated in Figures 3 and 9, to a selected position. As shown in Figure 3, the pivotally supported seat cushions 33 will remain in a substantially horizontal position in any normal position of the movable wall sections to which they are attached.

The supporting legs 27 freely slide along the trailer floor 28 to facilitate the proper support of the seats in any normal position thereof. The back cushions 35 will be pushed forwardly with reference to cushions 33, on their supporting links 26, to retain their normal vertical positions, the effect being to considerably increase the space between the opposite seats so that folding table 50 may be set up therebetween for dining or other purposes. When table 50 is not so in use, its legs may be folded parallel to its top and the table may be easily stored in any convenient place in the trailer.

For sleeping purposes, the back cushion 35 of each seat assembly may be raised to the position 37, Figure 4, to form an upper sleeping berth, the lower cushion 33 becoming a lower berth. If desired, the expansible wall sections may be moved to their outermost positions and the back cushions 35 placed in their lower horizontal position 38 to form a double bed. The legs 39 serve to support the outer edge of the cushion 35 in this position. As shown in Figure 4—A, the legs 39 may also serve to lock the supporting hooks 32 when the cushion 35 is in its upper horizontal position 37 as an upper berth.

The shower facilities may be used by moving expansible wall section 15 to an intermediate position wherein the arcuate bottom member 24 will serve as a shallow trough-like catch basin, and a plug 52 may serve as a drain therefor. The removable cushion 33 is taken out of its supporting frame 34 and the back cushion 35 is rotated to its position 40, Figure 4, to thereby enable a user to stand upon the curved bottom 24. The shower curtain 42 may be hung from the rod 31 to complete the shower arrangement.

In the form shown in Figures 8 and 9, the cushions 44, 45 and 47 cooperatively provide a seat with back supports for normal daytime use or when the trailer is in transit along a highway. When it is desired to provide a sleeping bed, the expansible wall section 46 is moved outwardly and the three cushions 44, 45 and 47 are arranged in a horizontal position at a common level as shown in Figure 9.

In either form of the invention, it is possible to have a trailer body built no wider than an ordinary automobile and yet provide ample space for normal living, including dining and sleeping, that would be comparable to the space provided by a trailer of rigid construction of considerably larger dimensions.

It will be noted that the sealing medium 19 is contacted by one or the other of the double flanged members 18 in either the open or the closed position of the movable wall sections, and also contacts the angle plates 21 and the bottom 24, thus effecting a seal against the entrance of dust or cold air as well as deadening the sound of any relative vibratory movement between the movable wall sections and the surrounding stationary walls.

It is further evident that a trailer body built according to the present invention will be much lighter in weight and less expensive of construction than would be a body built rigidly to provide as much space as is provided by the trailers herewith illustrated when they are in their greatest position of expansion. The reduction in weight results in easier and less costly towing or other transportation, so that the advantages reside both in the economy of original construction, as well as convenience, economy and safety in their use.

What I claim and desire to secure by Letters Patent is:

1. In a closed house trailer or the like, an angularly movable wall section, a self-leveling seat pivoted thereto, a back for the seat mounted to rotate from an upright position to a substantially horizontal position overhanging the seat, supporting means for the seat-back in its overhanging position, links pivoted on the seat at opposite ends thereof and pivoted to the seat-back, the seat-back and links being movable by rotation of the links, to a position substantially in a plane with the seat, and supports carried by the seat-back for maintaining the same at the elevation of the seat.

2. In a closed house trailer or the like, a seat supported against a wall of the trailer, a seat-back for the seat mounted to rotate from an upright position to a substantially horizontal position overhanging the seat, supporting means for the seat-back in its overhanging position, links pivoted on the seat at opposite ends thereof and pivoted to respective ends of the seat-back, and an element normally holding the links against movement relative to the wall, the seat-back being movable by rotation of the links upon release by the element, to a position in which it forms an extension of the seat.

HENRY GOEDDERTZ.